United States Patent

[11] 3,572,847

[72] Inventor Robert G. Luft
 Wildwood, Ill.
[21] Appl. No. 869,716
[22] Filed Oct. 27, 1969
[45] Patented Mar. 30, 1971
[73] Assignee International Harvester Company
 Chicago, Ill.

[54] DUAL STATION INTERLOCKING PARKING BRAKE
 7 Claims, 1 Drawing Fig.

[52] U.S. Cl.................................................. 303/13,
 180/77, 188/106, 303/2
[51] Int. Cl.......................................................... B60t 13/38,
 B60t 17/18
[50] Field of Search............................................ 180/77, 77
 (S); 188/106, 106 (P); 303/13, 9, 2, 14, 68—69, 6,
 6 (A)

[56] References Cited
 UNITED STATES PATENTS
 1,969,056 8/1934 Wolfe et al. .................. 303/13X
 2,041,884 5/1936 Vorech et al. ................. 303/13
 2,240,166 4/1941 Stanley............................ 303/13
 2,292,105 8/1942 Davis............................... 303/13

*Primary Examiner*—Milton Buchler
*Assistant Examiner*—John J. McLaughlin
*Attorney*—Noel G. Artman

ABSTRACT: A brake control for a vehicle with a source of fluid pressure having a pair of actuator valves for directing fluid pressure from the source to the brake to effect its release and a selector valve for selectively directing fluid pressure from the source to one of said actuator means while isolating the other actuator means from said source.

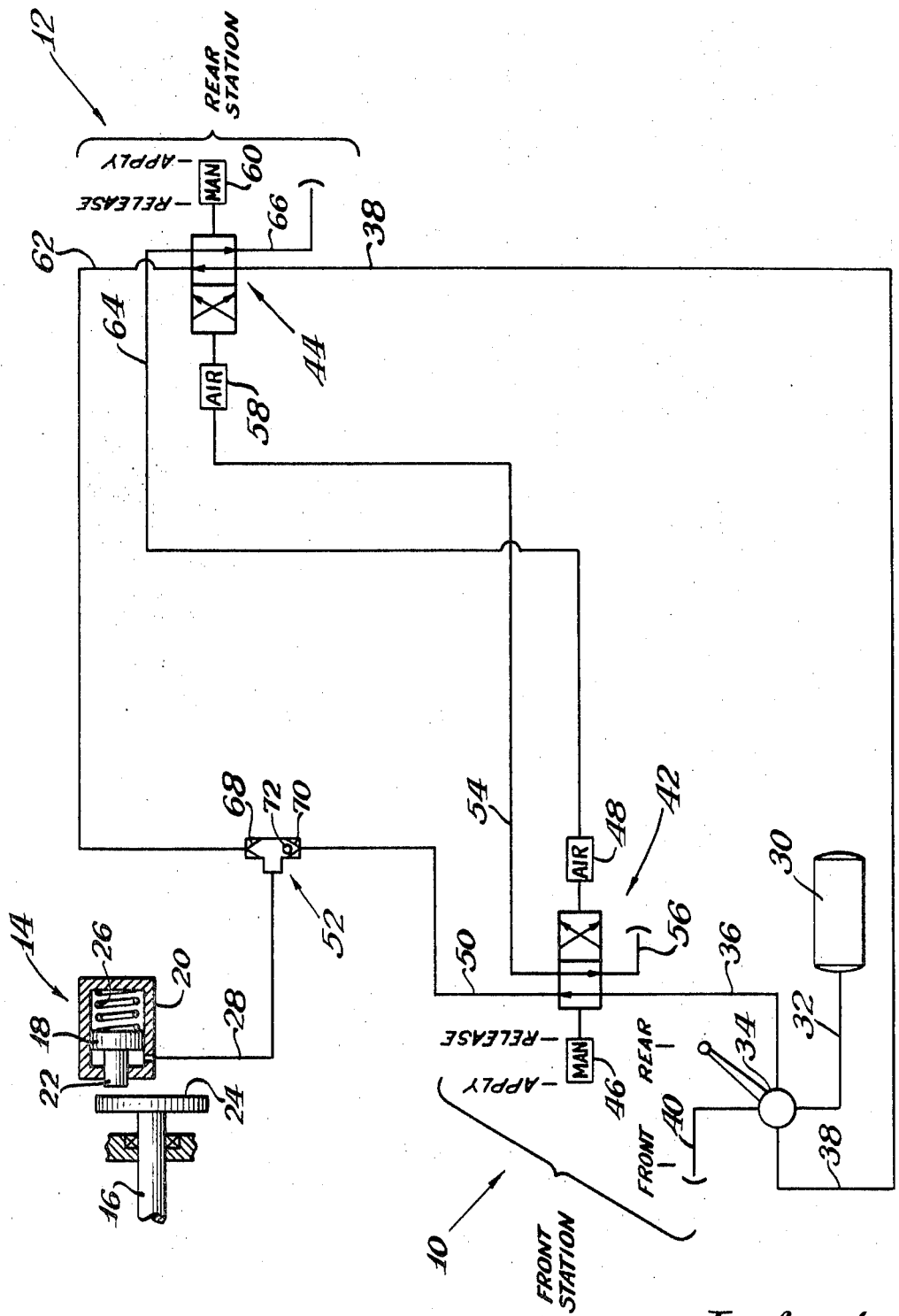

DUAL STATION INTERLOCKING PARKING BRAKE

BACKGROUND AND SUMMARY OF THE INVENTION

In certain large vehicles, such as those utilized to tow the jumbo jet aircraft, the size of the machine requires a control or operators's compartment at each end. Manipulation of such a large vehicle in close proximity to the aircraft, which is necessary to effect the physical connection between the tow tractor and the aircraft itself, and often also to provide ground support for the electrical and air-conditioning systems within the aircraft, requires that the operator be located in a position to readily observe and judge the distance to the various aircraft appendages. Any damage to the aircraft must be precluded and to achieve this goal no contact with the aircraft can be tolerated. Dual operator stations, one at either end of the vehicle, are provided so that the operator may be positioned at the forward end of the vehicle regardless of its direction of travel. Dual operator stations, however, require the operator to physically leave one station and walk to the other. During this span of time, the vehicle would normally be unattended and a parking brake must be provided to prevent the vehicle from rolling. It is therefore apparent that the brake must be capable of being applied from one station and released at the other.

It is therefore an object of the present invention to provide a control means for a parking brake which permits the application of the brake in one location on the vehicle and the release of the brake from a different location.

It is also an object of the present invention to provide a control means for a parking brake which will physically indicate by movement of the manual brake actuator means at one location that the brake has been applied at the other location.

Another object of the invention is to prevent inadvertent release of the parking brake, once it has been applied, through movement of the station selector valve.

These, and other objects of the present invention and many of its attendant advantages will become apparent upon a perusal of the following description of a preferred embodiment made with reference to the drawing of which the FIG. is a schematic view of a braking system embodying the present invention.

DESCRIPTION OF A PREFERRED EMBODIMENT

A vehicle, which may be of the type disclosed in application Ser. No. 796,371 filed Feb. 4, 1969, is provided with a front station, schematically indicated at 10, and a rear station, schematically indicated at 12. The parking brake 14 is provided on the vehicle to retard or stop a shaft 16 comprising a portion of the drive train for the vehicle. The parking brake 14 includes a piston member 18 which is reciprocally mounted within a cylinder 20. An extension 22 formed on the piston 18 protrudes from the cylinder 20 and is frictionally engageable with a disc member 24 secured to the shaft 16. A spring member 26 positioned between the piston 18 and the end wall of the cylinder 20 urges the extension member 22 into frictional engagement with the disc 24. A conduit 28 communicates with the interior of the cylinder 20 at the end of the cylinder opposite the spring member 26. Providing fluid under pressure through the conduit 28 will urge the piston member 18 to the right as viewed in the drawing against the bias of the spring 26, thereby disengaging or releasing the parking brake.

The fluid utilized is preferably air and is provided from a reservoir 30. A conduit 32 connects the reservoir with the selector valve 34. The station selector valve is a two-position type, the front position of which will connect the conduit 32 with the conduit 36 while connecting conduit 38 with the exhaust conduit 40 and the rear position connects the conduits 32 and 36 with conduits 38 and 40 respectively. The conduit 36 is connected to the front brake actuator valve 42 and the conduit 38 is connected with the rear brake actuator valve 44, while the conduit 40 is open to atmosphere.

The front actuator valve 42 is a two-position type which is movable either through the manual control means 46 between an applied position and a release position and is also movable to its applied position by an air actuator 48. In the release position, as shown in the drawing, the conduit 36 is placed in fluid communication with the conduit 50, which conduit is connected with the conduit 28 leading to the cylinder 20 through a tee connector 52. Two other conduits 54 and 56 are in communication with the front actuator valve 42. In the release position the conduit 54 is placed in communication with the conduit 56 which is vented to atmosphere. Conduit 54 is connected at its other end with an air actuator valve 58 associated with and controlling the position of the rear actuator valve 44. Movement of the front actuator valve to its apply position connects the pressure conduit 36 with conduit 54, which causes the air actuator mechanism 58 to move the rear actuator valve 44 to its apply position, and connects the conduit 50 with the conduit 56, which will exhaust fluid pressure from the cylinder 20 through conduits 28, connector 52 and conduits 50 and 56. The rear actuator valve 44 also has a manual actuator means 60 which manually controls the position of the rear actuator valve 44 in addition to the air actuator means 58 which is capable of moving the rear actuator valve 44 to its apply position. In addition to conduit 38, three other conduits are in communication with the rear actuator valve 44, namely conduit 62, 64 and 66. Conduit 62 is connected at its other end with the tee connector 52, the conduit 64 communicates with the air actuator means 48 on the front actuator valve 42 while the conduit 66 is an exhaust conduit open to the atmosphere. In its release position, the conduit 36 is in communication with conduit 62 and permits the communication of air pressure to the cylinder 20 to the conduits 38 and 62 through tee connector 52 and conduit 28. Simultaneously, the air actuator 48 is exhausted through conduit 64 and 66. In the apply position, the pressure conduit 38 is placed in communication with the conduit 64 which permits the air pressure to act upon the air actuator means 48 to also shift the front actuator valve 42 to its apply position. Simultaneously the conduit 62 leading from the tee connector 52 is exhausted to atmosphere through the conduit 66.

The tee connector 52 includes a shuttle valve which is represented by a pair of seats 68 and 70 and a ball check 72. The ball 72 is forced against the seat 68 to seal off the conduit 62 whenever air under pressure is present in the conduit 50. Similarly the ball 72 will be forced against the seat 70 to seal off the conduit 50 whenever air under pressure is present in the conduit 62. The ball 72 is movable between these two positions to maintain the brake in its released position regardless of the position of the selector valve 34.

It will be apparent from the foregoing description of of a preferred embodiment, that the present invention provides a control means for a parking brake which is operable from either end of the vehicle, which provides a visual indication that the brake has been applied whenever either the front actuator valve or the rear actuator valve have been moved to the apply position and which, by shifting the nonselected station actuator valve to its apply position, once the selected station valve has been moved to its apply position, the parking brake cannot be released simply by moving the selector valve.

It is to be understood that various changes and modifications may be made, such as, for example, substitution of an air over hydraulic system for the straight air system disclosed to actuate the parking brake, without departing from the scope of the invention.

I claim:

1. In a vehicle having dual control stations, a brake which is operatively connected to prevent movement of the vehicle when applied, and a source of fluid under pressure, the improvement comprising:

first and second actuator valves, one of which is located in each station, each actuator valve having a release position in which said fluid pressure is directed to release said brake and an apply position in which fluid pressure is exhausted to apply said brake; and a selector valve for selectively connecting the source of fluid pressure to one of said actuator valves while simultaneously isolating the other of said actuator valves from said source.

2. In a vehicle according to claim 1, and further comprising: first and second pilot-operated actuator means operatively connected to the first and second actuator valves respectively for moving the associated actuator valve to its apply position in response to receiving a pressure signal; and conduit means extending between the first actuator means and the second actuator valve and between the second actuator means and the first actuator valve, each of said actuator valves being capable of directing a fluid pressure signal through said conduit means when moved to its apply position.

3. In a vehicle according to claim 2 wherein said actuator valves are movable from their release positions only by said actuator means and by the application of manual force.

4. In a vehicle according to claim 1, and further comprising shuttle valve means interposed between said actuator valves and said brake for permitting communication between the brake actuator valve to which fluid pressure is directed by said selector valve while isolating the other of said actuator valves from the brake.

5. A means for controlling the parking brake from either one of two operator stations on a vehicle having a source of fluid pressure, said control means comprising:

a pair of actuator valves one of which is located in each station, each actuator valve having a release position and an apply position; and a selector valve for selectively connecting said source to one of said actuator valves while simultaneously isolating the other of said actuator valves from said source.

6. The invention according to claim 5, and further comprising:

a pilot-operated actuator means operatively connected to each of said actuator valves for moving the associated actuator valve to its apply position in response to receiving a pressure signal;

conduit means extending between each actuator valve and the actuator means associated with the other actuator valve; and each of said actuator valves being capable of directing a pressure signal through said conduit means when moved to its apply position.

7. The invention according to claim 6, and further comprising check valve means interposed between the actuator valves and the parking brake for permitting communication between the actuator valve to which fluid pressure is directed by the selector valve while isolating the other actuator valve from the parking brake.